United States Patent
Koch et al.

(10) Patent No.: US 8,282,306 B2
(45) Date of Patent: Oct. 9, 2012

(54) JOINT BETWEEN TWO HINGE-LINKED VEHICLE PARTS SUCH AS OF AN ARTICULATED VEHICLE, COMPRISING AN ARTICULATED JOINT

(75) Inventors: Robert Koch, Bad Sooden-Allendorf (DE); Lothar Scharf, Bad Sooden-Allendorf (DE)

(73) Assignee: Hübner GmbH, Kassel (DE)

( * ) Notice: Subject to any disclaimer, the term of this patent is extended or adjusted under 35 U.S.C. 154(b) by 180 days.

(21) Appl. No.: 12/308,917

(22) PCT Filed: Feb. 29, 2008

(86) PCT No.: PCT/DE2008/000366
§ 371 (c)(1),
(2), (4) Date: Dec. 29, 2008

(87) PCT Pub. No.: WO2008/119315
PCT Pub. Date: Oct. 9, 2008

(65) Prior Publication Data
US 2010/0013190 A1    Jan. 21, 2010

(30) Foreign Application Priority Data

Apr. 2, 2007    (DE) .......................... 10 2007 015 906
Oct. 13, 2007   (DE) ..................... 20 2007 014 350 U

(51) Int. Cl.
*F16J 1/16*    (2006.01)
(52) U.S. Cl. ................................................. 403/154
(58) Field of Classification Search ............ 403/91, 403/145, 146, 150, 151, 152, 153, 154, 155, 403/156, 157, 158, 159, 160, 161, 162, 163, 403/355, 365, 368, 369, 371; 305/41, 42; 280/403, 493, 494, 498, 499; 384/192
See application file for complete search history.

(56) References Cited

U.S. PATENT DOCUMENTS

| 531,884   | A  | * | 1/1895  | Watrous ........................... 278/61 |
| 2,226,524 | A  | * | 12/1940 | Runge et al. .................. 403/355 |
| 4,188,146 | A  | * | 2/1980  | Stecklein ....................... 403/158 |
| 5,205,667 | A  | * | 4/1993  | Montgomery, Sr. .......... 403/151 |
| 6,938,855 | B2 | * | 9/2005  | Marche ............................ 244/54 |

FOREIGN PATENT DOCUMENTS

| DE | 1133749 B        | 7/1962   |
| DE | 10360289 A1      | 7/2005   |
| DE | 102006050210.8   | 4/2008   |
| GB | 2295130 A        | 5/1996   |
| WO | WO 2004031067 A1 * | 4/2004 |

* cited by examiner

*Primary Examiner* — Michael P Ferguson
*Assistant Examiner* — Daniel Wiley
(74) *Attorney, Agent, or Firm* — Gifford, Krass, Sprinkle & Anderson & Citkowski, P.C.

(57) ABSTRACT

A joint (1) between two vehicle components (2, 3) joined to each other with a hinge, such as of an articulated vehicle, comprising an articulated joint (10), wherein the articulated joint (10) comprises two joint segments (11, 12) that are rotatably connected to each other by a tensioning device (20) acting as a vertical axis, the one, first joint segment (11) having a U-shaped, jaw-like opening (13) for seizing the other, second joint segment (12) in the region of the vertical axis, sliding devices (16) being provided between the joint segments (11, 12) and acting in at least the axial direction, the tensioning device (2) operable to generate pretension on the joint segments (11, 12), the one joint segment (11) having two joint segment elements (11a, 11b) that are each separately fastened with screws to the frame (40) of the vehicle frame (3).

5 Claims, 4 Drawing Sheets

JOINT BETWEEN TWO HINGE-LINKED VEHICLE PARTS SUCH AS OF AN ARTICULATED VEHICLE, COMPRISING AN ARTICULATED JOINT

FIELD OF THE INVENTION

The present invention relates to a joint between two hinge-linked vehicle parts, such as of an articulated vehicle, comprising an articulated joint.

BACKGROUND OF THE INVENTION

An articulated vehicle that can be coupled from several parts is well known in the art. The parts of such an articulated vehicle are coupled together through a hinge connection. The hinge connection is bridged by a bellows, a connection gangway being provided to enable passengers to transit from one vehicle part to the other.

It is known that articulated trains or also articulated vehicles are subject to most disparate kinds of motions. The joints must be capable of absorbing all the roll, pitch and bending motions. In the present case, the term of joint comprises the entire hinged arrangement between two vehicle parts. Roll motions are understood to refer to movements during which the two vehicle parts are caused to rotate relative to each other about the longitudinal axis. Bending motions occur when the articulated vehicle negotiates a curve with the two vehicle parts whilst pitch movements occur when such an articulated train travels over a hill or through a depression.

For negotiating curves and e.g., for travelling through a depression, a known hinge connection between the vehicle parts comprises an articulated and a pitch joint. The pitch joint allows movement of the two vehicle parts relative to each other about an axis transverse to the longitudinal axis of the vehicle. Usually, the pitch bearings provided for this purpose are configured to be metal rubber bearings.

Hitherto, one assumed that, due to the inherent elasticity of the chassis of the respective vehicle parts, the roll motions were absorbed by the chassis itself. One had any reason to believe this because the roll angles were 3° at the most. In the meantime however, it has been found out that even with such quite small roll angles, torques of up to 35 kNm act onto the hinge or also onto the chassis. Insofar, damage to the chassis and/or the joint cannot be excluded. In particular the articulated joint, which makes it possible for an articulated train to negotiate a curve, is subject to heavy loads. This is reflected by the fact that roller bearings of considerable dimensions have to be mounted in the region of the articulated joint, said bearing finally not only transmitting the fifth-wheel load between the car sections but also being capable of transmitting the forces occurring during the already explained roll movements.

In this context, the document DE 10 2006 050 210.8 already describes how to connect the articulated joint, which is a constituent part of the hinge, to the one vehicle part through a hinge arrangement in order to transmit pitch and roll movements. This means the hinge incorporates two hinge elements, namely an articulated joint and one additional hinge element, which transmits pitch and roll movements. Since such a hinge arrangement allows for transmitting pitch and roll movements, both the loads on the chassis of the two vehicle parts and on the hinge itself can be avoided. The reason therefore is that finally, through the articulated joint, only the fifth-wheel load and the tensile force as well as a small roll torque of <10 kNm have to be transmitted. Hitherto, the articulated joint comprises roller bearings of considerable dimensions. Considering that the forces acting onto the articulated bearing are not considerably lower thanks to the hinge construction found, other bearings may be utilized, which are considerably less expensive than the roller bearings used hitherto, which are of very large dimensions.

Furthermore, an articulated bearing is known from DE 11 33 749, said bearing being provided with two superimposed forks which, as a part of the articulated joint, receive each, between the forks, one bearing plate of the other part of the articulated joint. For connecting the respective fork and the bearing plate, threaded through bolts are provided. One of the two forks has, between its leg and the bearing plate, what are referred to as adjusting washers acting in a way similar to so-called thrust washers. The legs of the joint are hereby tensioned against the adjusting washers. The result thereof is that the thrust washers are irregularly loaded since the legs of the fork will taper slightly conically after having been tensioned through the threaded bolt since the forks are made from one piece. This causes the edges to be pressed against the adjusting washers, which leads to early wear of the bearing.

SUMMARY OF THE INVENTION

In accordance with the invention there is provided that the articulated joint incorporates two joint segments that are joined together for rotation about a tensioning device acting as the vertical axis, the first joint segment comprising a U-shaped, mouth-like opening for taking hold of the other, second joint segment in the region of the vertical axis, gliding devices acting between the joint segments at least in the axial direction, meaning in the direction of the joint axis, being provided, the tensioning device comprising means for generating a bias upon the joint segments, the one joint segment comprising two joint segment elements which are fastened separately onto the frame of the vehicle parts, with screws. What matters now is on the one side that gliding devices are provided for transmitting the relative movement between the two joint segments of the articulated joint. In order to efficiently retain gliding devices in the long run, it is necessary that the joint segments, between which the gliding devices are located, move relative to each other with zero clearance. This means that, by separately fastening the joint segment elements, it is possible to adjust the gliding devices so as to provide a zero clearance fit. On the other side, by separately fastening the joint segment elements on the frame, one does not incur the risk of tensioning the joint segment elements relative to the second joint segment. The reason therefore is that at first the first and the second joint segment are joined together, with the connection to the respective one of the vehicle parts occurring only then. Through corresponding long holes on the frame of the vehicles, one achieves certain variability.

For zero clearance, there is provided, in accordance with the teaching of the invention, a tensioning device comprising means for generating a bias upon the joint segments. It appears clearly that even if the gliding devices are subject to wear with time, a zero clearance fit is permanently ensured through the bias.

More specifically, to generate the bias, there is advantageously provided that the tensioning device incorporates an axle bushing and a counter nut, said axle bushing being connected to the counter nut by preferably one threaded bolt, the two joint segments being adapted to be biased against the force of a spring device through the preferably one threaded bolt. The axle bushing hereby acts as the axis for the articulated joint about which the two joint segments move relative to each other. In order to be capable of applying the corresponding pressure force onto the joint segments in the axial direction of the axle bushing, there is provided, in accordance with another feature of the invention, that the axle bushing comprises a collar acting onto the one first joint segment and that the nut accordingly comprises a corresponding collar that acts on the other side onto this one first joint segment.

According to another feature of the invention, the axle bushing comprises on its inner surface a circumferential web for abutment of the head of the threaded bolt. As a result, the tensioning device is substantially flush with the surface of the first joint segment.

According to a first embodiment, there is now provided that the second joint segment comprises, in the region of the tensioning device, on the top side and on the bottom side, a circular ring-shaped shoulder for respectively receiving a thrust washer, said thrust washer being adapted to be pressed toward the first joint segment by at least one, preferably three for reasons of balance, spring systems, which are evenly spaced on the circumference, a gliding device being provided between the thrust washer and the first joint segment. Through the thrust washer in connection with the spring system, through which the thrust washer is pressed toward the gliding device, for example a washer disc made e.g., from PTFE, one obtains that the two joint segments are in principle always joined together. I.e., the apparatus is self-adjusting, which means that wear of the washer disc is accommodated by the tensioning device and more specifically by the spring system. As already explained, the washer disc is pressed toward the first joint segment by a spring system. In this case, the spring system comprises several circumferentially spaced cup spring piles, each cup spring pile being more specifically guided by a guide bolt. As a result, the washer disc, which is configured to be a gliding device, is evenly loaded by the thrust washer and is thus evenly pressed onto the first joint segment. The cup spring pile is seated in a mould-like cavity, which is located underneath the thrust washer. The guide bolt, which is disposed in the mould-like cavity, ensures that the cup spring pile is guided and that the thrust washer is prevented from rotating.

The gliding device, which is configured to be a washer disc, transmits the forces in the direction of the axis of the tensioning device. These forces are substantially torques due to the fifth-wheel load and also small roll torques. In order to also be capable of transmitting braking and acceleration forces, what is referred to as a sliding bushing is provided between the axle bushing and the second gliding segment. This sliding bushing can also be made from the same material as the washer disc, which is configured to be a sliding device.

A second embodiment is characterized in that, between the threaded bolt and the web, a spring system is disposed on the inner surface of the axle bushing. A spring system, which is in particular configured to be a cup spring pile, is kept pressed against the second joint segment in the region of the mouth-like opening of this first joint segment. In this context, the following is noted:

To form the mouth-like, U-shaped opening, the first joint segment more specifically incorporates an upper and a lower joint segment element. These two joint segment elements are screwed to the frame of the chassis, with the bearing being assembled first. This directly results in that, in order to generate zero clearance between the two joint segments, both the threaded bolt and the cup spring pile must overcome the inherent elasticity of the first joint segment, which is particularly difficult if the articulation to the frame of these joint segment elements, which form the first joint segment, occurs substantially through a rigid connection. This is the advantage of the first embodiment over the second one, for therein, the rigidity of the first joint segment has no influence upon the zero clearance fit.

In the second variant, there is further provided, like in the first embodiment, that the gliding devices disposed between the joint segments are configured to be washer discs, a sliding bushing also being provided between the axle bushing and the second joint segment.

In the third embodiment, there are provided two so-called spherical bearings as the gliding devices. Such a spherical bearing is characterized by the fact that it is configured to be a sliding bearing and comprises two bearing shells, said two bearing shells comprising arcuate adjacent sliding surfaces. Through the arcuate contour of the bearing shells, one obtains that such a bearing is capable of absorbing forces both in the radial and in the axial direction. What is of much more important though is that such a spherical bearing is capable of ensuring zero clearance operation of the two component parts connected by such a spherical bearing.

For the instant case of the invention, this means that, for generating a zero clearance fit, the two bearing shells, which are facing each other in the direction of the axis, of the two sliding bearings, are subjected to the force of a spring so that such a spherical bearing is in principle self-adjusting, i.e., that the wear on the two adjacent bearing shells of each spherical bearing is compensated or accommodated by the force of the spring.

In order to make this adjustment process possible, there is provided that the sliding bearing, which is subjected to the force of the spring, is configured to be a loose bearing, whilst the other sliding bearing is configured to be a fixed bearing. The loose bearing is prevented from rotating out of place by a feather key.

There is more specifically provided that the one bearing shell of the spherical bearing abuts the one joint segment, whilst the other bearing shell of the spherical bearing fits against the other joint segment. The cup springs, which are in particular configured to be a spring pile, act on the two bearing shells of a respective one of the spherical bearings, said bearing shells being located opposite each other in the direction of the axis, i.e., in the longitudinal direction of the axis of rotation, and thus press the two bearing shells of a respective one of the spherical bearings against each other, certain signs of wear during operation being compensated by the arcuate contour.

All the implementation variants have in common that the axle bushing is immobilized against rotation on the first joint segment, this also applying for the counter nut. This means, it must be made certain hereby that only the second joint segment is capable of rotating relative to the first joint segment.

BRIEF DESCRIPTION OF THE DRAWINGS

Herein after, the invention will be explained in closer detail by way of example with reference to the drawings.

DETAILED DESCRIPTION OF THE INVENTION

Figure 1:
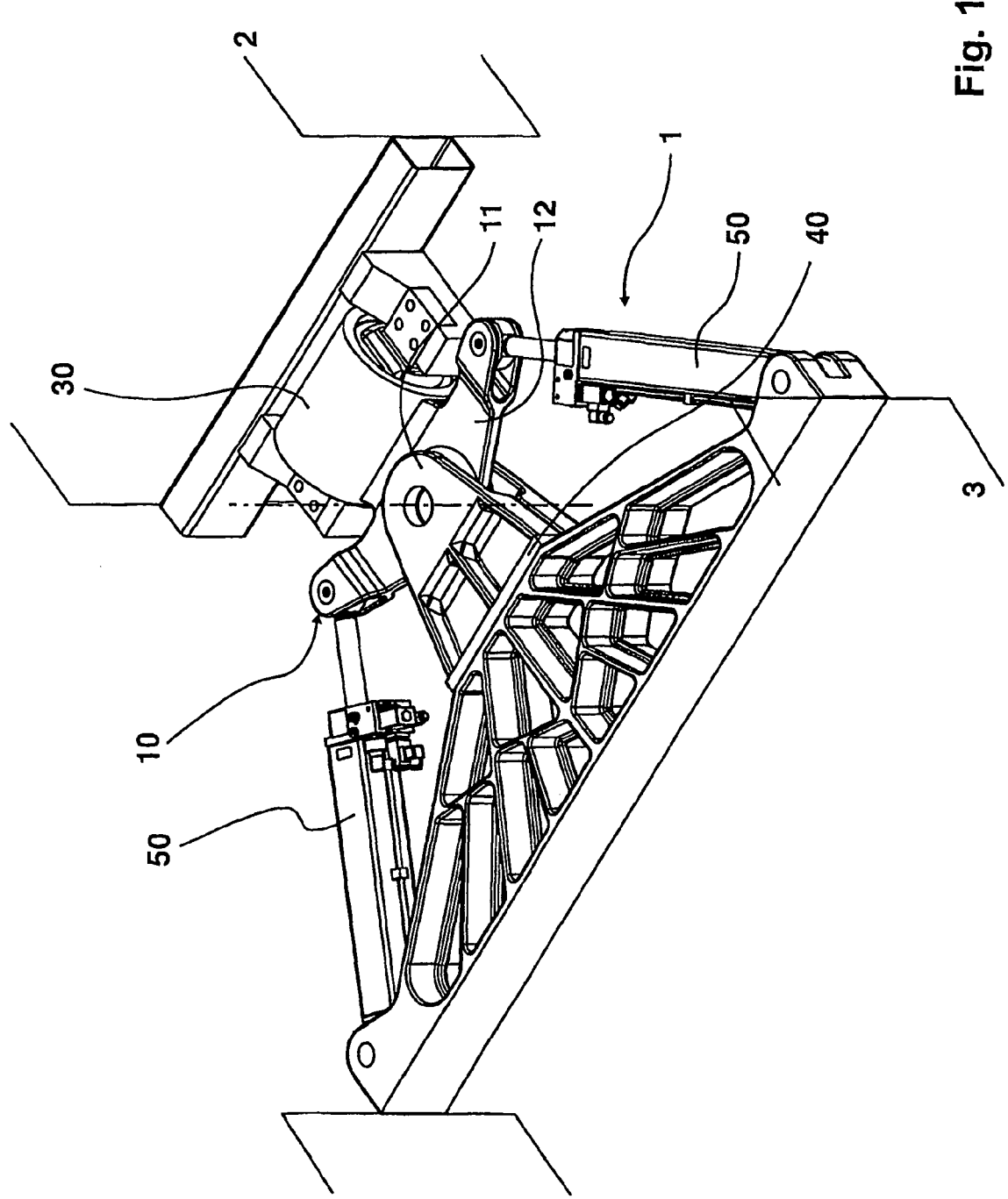
FIG. 1 shows a general drawing of the joint between two vehicle parts.

FIG. 1 shows the joint 1 between the two vehicle parts 2, 3. The joint 1 incorporates more specifically the articulated joint labelled at 10 and the pitch/roll bearings 30 interposed between the articulated joint and the vehicle part 2. The articulated joint 10 is connected to the vehicle part 3 through the frame 40, dampers 50 being provided between the articulated joint 10 and the frame 40. The articulated joint rotates about the axis 60.

The invention is now directed to the configuration of the articulated joint 10. In the two variants as shown in the FIGS. 2 and 3, the articulated joint 10 incorporates the one first joint segment 11 and the second joint segment 12. The first joint segment 11 possesses a U-shaped, mouth-like opening 13, which serves for accommodating the other, second joint segment 12. The one first joint segment 11 incorporates the two joint segment elements 11a and 11b, which are each fastened to the frame 40 by screws (not shown).

To connect the two joint segments 11, 12, there is now provided the tensioning device, which is labelled at 20 and which also forms the axis of rotation and of articulation. The tensioning device labelled at 20 incorporates the axle bushing 21 and the counter nut 22, said axle bushing 21 communicating with the counter nut 22 through the threaded bolt 23. Both the axle bushing 21 and the counter nut 22 each have a collar 21a, 22a by which both the counter nut and the axle bushing abut the lower and the upper side of the joint segment 11, as can be seen from both FIG. 2 and FIG. 3. Both the axle bushing 21 and the counter nut 22 are non-rotatably fixed to the joint segment 11 by pins 21b, 22b. This is to ensure that relative movement indeed only occurs between the two joint segments 11, 12.

To connect the threaded bolt 23 to the counter nut 22, the axle bushing has on its inner surface a circumferential web 21c for the head of the threaded bolt 23 to abut. Between the front side of the second sliding segment 12 and the axle bushing 21, there is provided a sliding bushing 24. This sliding bushing 24 transmits acceleration and braking forces when the vehicle is starting and braking.

Figure 2:
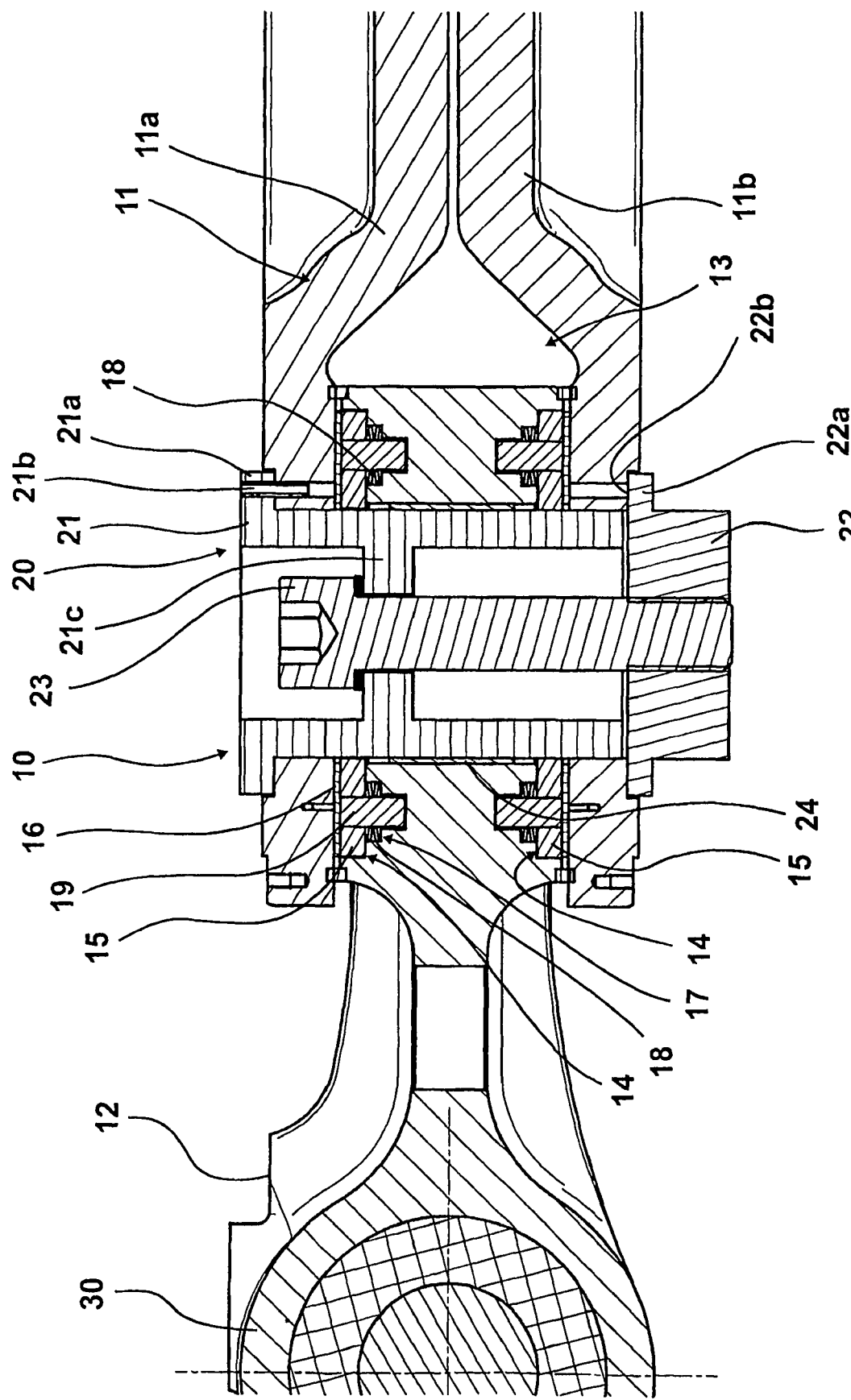
FIG. 2 shows a first embodiment of an articulated joint.

In the embodiment shown in FIG. 2, the following is provided to both transmit the fifth-wheel load and the small roll torques and to allow for the movement of rotation of the two joint segments 11, 12:

The second joint segment 12 comprises the circular ring-shaped shoulder 14. In this circular ring-shaped shoulder 14, there is mounted the thrust washer labelled at 15. Above the thrust washer there is located the washer disc 16, made e.g., from PTFE, which acts as a gliding device and which is fastened to the inner surface of the mouth-like opening of the joint segment 11. Underneath the thrust washer 14, there are provided several circumferentially spaced mould-like recesses 17 for accommodating individual cup spring piles 18. Through these cup spring piles 18, which are each guided through a guide bolt 19, the thrust washer 14 is pressed, together with the washer disc resting thereon, against the washer disc 10 on the joint segment 11, as this is obvious from FIG. 2.

Insofar, through the cup spring piles, one always obtains a zero clearance fit between the two joint segments 11, 12, this fit allowing for relative rotation between the two joint segments though.

Figure 3:
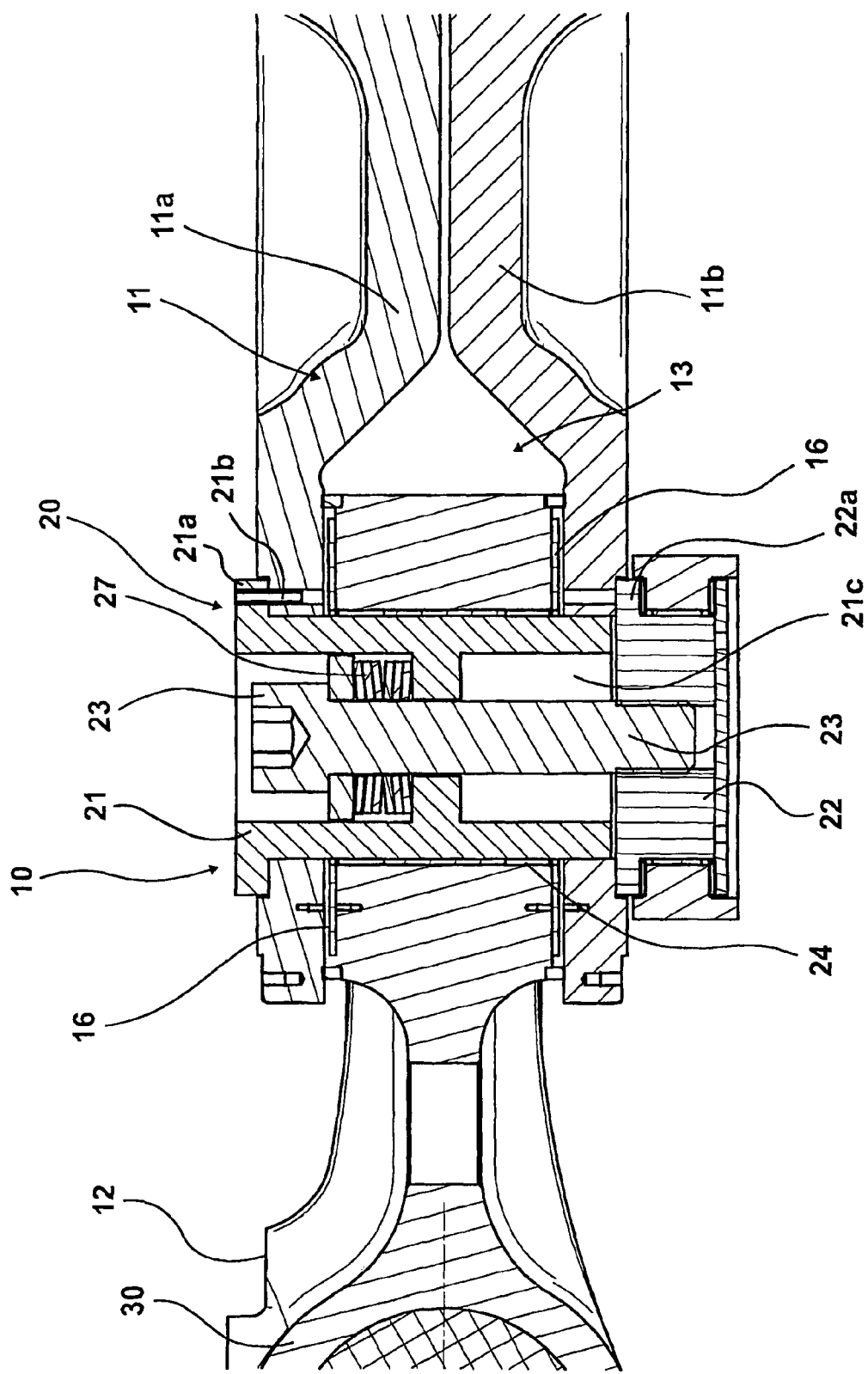
FIG. 3 shows a second embodiment of an articulated joint.

The embodiment as shown in FIG. 3 differs from the embodiment shown in FIG. 2 by the fact that there, the bias effected by a cup spring pile 27 located between the head of the threaded bolt 23 and the web 21c, is maintained.

Figure 4:
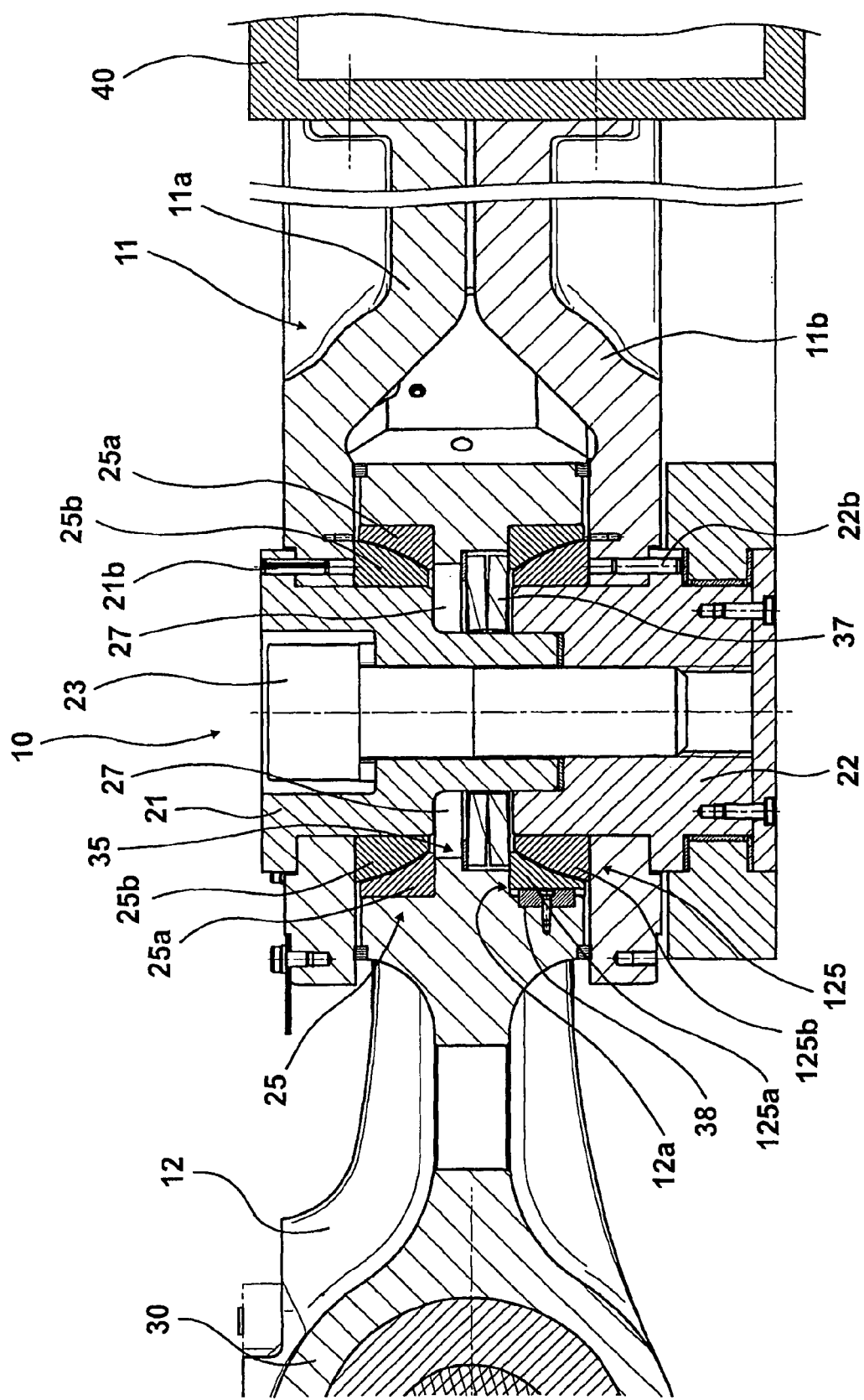
FIG. 4 shows a third embodiment of an articulated joint.

In principle, the embodiment as shown in FIG. 4 differs from the embodiment as shown in the FIGS. 2 and 3 by the fact that two so-called spherical bearings 25 are being utilized, which are superimposed in the direction of the axis of the articulated bearing, meaning in the direction of the axis of rotation of the articulated bearing. The two joint segments 11 and 12 are hereby hinged for rotation by the two spherical bearings 25. More specifically, the connection is thus that the one joint segment 12 comprises a hole 35, which finally serves for accommodating the articulated bearing. In the region of the hole 35, the joint segment 12 comprises a circumferential collar 12a. The bearing shells 25a, 125a of the spherical bearing 25, 125 rest on the collar 12a. The respective corresponding bearing shell 25b, 125b of each of the spherical bearings 25, 125 abuts the other joint segment 11, as can be seen directly when reviewing FIG. 4.

To establish the rotatable articulated connection between the two joint segments 11 and 12, there are now provided the threaded bolt 23 as well as the axle bushing 21 and the counter nut 22, said axle bushing 21 and said counter nut 22 communicating together through the threaded bolt 23. In the region of the circumferential collar 12a, the axle bushing 21 and the counter nut 22 form a space which will be referred to herein after as the spring chamber 27, and in which the cup spring pile 37 is seated in the form of the spring system. The arrangement of the two bearing shells 125a, 125b of the loose bearing 125 is hereby such that the cup spring pile acts onto the bearing shell 125a and that this bearing shell 125a is kept pressed against the respective bearing shells 125b by the force of the cup spring pile 37. As a result, clearance occurring through wear on the contact surface of the two bearing shells 125a and 125b is accommodated or compensated. The loose bearing 125 is kept secured against rotation by the feather key 38.

For the rest, like reference numerals are used to denote like elements in the FIGS. 2, 3 and 4.

The invention claimed is:

1. A joint (1) between two hinge-linked vehicle parts (2, 3) of a hinge-linked vehicle for transporting passengers, said joint comprising:

a first joint segment (11) having two joint segment elements (11a, 11b) that form a U-shaped opening (13) therebetween, said two joint segment elements (11a, 11b) being fastened separately on a frame (40) of one of the hinge-linked vehicle parts (3) by screws;

a second joint segment (12) located within said U-shaped opening (13);

a tensioning device (20) inserted through aligned apertures in said first joint segment (11) and said second joint segment (12), said tensioning device (20) comprising an axle bushing (21), a counter nut (22), a threaded bolt (23) and a spring pile (27), wherein said axle bushing (21) comprises a circumferential web (21c) extending inwardly from an inner periphery of said axle bushing (21);

said threaded bolt (23) being inserted into a first end of said axle bushing (21) and extending at least partially through said inner periphery of said axle bushing (21) and threadingly engaging said counter nut (22) at a second end of said axle bushing (21) opposite said first end, with said spring pile (27) located between said circumferential web (21c) and a head of said threaded bolt (23);

said axle bushing (21) and said counter nut (22) each having a collar (21a, 21b), said axle bushing collar (21a) and said counter nut collar (21b) being non-rotatably fixed to and abutting a respective one of said two joint segment elements (11a, 11b) of said first joint segment (11) such that said tensioning device (20) attaches said first joint segment (11) to said second joint segment (12) and forms an axis of rotation and articulation between said first joint segment (11) and said second joint segment (12); and whereby said spring pile (27) biases said axle bushing (21) and said counter nut (22) against said two joint segment elements (11a, 11b) of said first joint segment (11) such that contact is maintained between said first joint segment (11) and said second joint segment (12) while allowing said first joint segment (11) and said second joint segment (12) to rotate about said axis of rotation.

2. The joint as set forth in claim 1, characterized in that the axle bushing (21) is connected to the counter nut (22) through a threaded bolt (23), the two joint segments (11, 12) being adapted for being biased against a force of said spring pile (27) by said threaded bolt (23).

3. The joint as set forth in claim 1 characterized that a gliding device (16) is provided between said second joint segment (12) and said first joint segment (11).

4. The joint as set forth in claim 3, characterized in that the gliding device (16) is configured to be a washer disc.

5. The joint as set forth in claim 1, characterized in that a sliding bushing (24) is provided between the axle bushing (21) and the second joint segment (12).

\* \* \* \* \*